United States Patent [19]

Wakasa

[11] Patent Number: 4,873,601
[45] Date of Patent: Oct. 10, 1989

[54] SPOT NETWORK TYPE POWER RECEIVING AND TRANSFORMING PROTECTIVE APPARATUS

[75] Inventor: Fumio Wakasa, Kitaibaraki, Japan
[73] Assignee: Hitachi, Ltd., Tokyo, Japan
[21] Appl. No.: 169,612
[22] Filed: Mar. 17, 1988
[30] Foreign Application Priority Data
Mar. 18, 1987 [JP] Japan .................................. 62-60937
[51] Int. Cl.$^4$ ............................................. H02H 7/26
[52] U.S. Cl. ....................................... 361/64; 361/67; 361/81; 307/43; 307/86
[58] Field of Search ....................... 361/62, 63, 64, 67, 361/68, 81; 307/11, 13, 31, 39, 42, 43, 52; 302/85, 86

[56] References Cited

U.S. PATENT DOCUMENTS

| | | | |
|---|---|---|---|
| 3,710,188 | 1/1973 | Oyachi .................................. | 361/64 |
| 3,991,359 | 11/1976 | Thompson et al. .................... | 307/13 |
| 4,354,215 | 10/1982 | van der Scheer ..................... | 361/63 |
| 4,663,691 | 5/1987 | Köppl ................................... | 361/65 |
| 4,724,502 | 2/1988 | Kawahir et al. ...................... | 361/62 |

Primary Examiner—A. D. Pellinen
Assistant Examiner—Jeffrey A. Gaffin
Attorney, Agent, or Firm—Antonelli, Terry & Wands

[57] ABSTRACT

A device which protects a spot network type power receiving and transforming system when, while the system and an electric generator are operating in parallel, overall interruption of power supplied to the primary side of network transformers occurs suddenly. In the spot network type power receiving and transforming system, protector circuit breakers are provided on several branch buses connected to a common bus and a generator circuit breaker is connected to the electric generator; a link circuit breaker is connected to the common bus between the spot network type power receiving and transforming system and the electric generator; and network relays are connected in parallel with the protector circuit breakers respectively. Under the condition that all of the circuit breakers and network relays are in operation, one of the circuit breakers is tripped to prevent flow of reverse current from the generator toward the spot network type power receiving and transforming system, thereby ensuring the safety of maintenance and inspection of power supply buses after the overall service interruption.

14 Claims, 4 Drawing Sheets

SPOT NETWORK TYPE POWER RECEIVING AND TRANSFORMING PROTECTIVE APPARATUS

BACKGROUND OF THE INVENTION

This invention relates to an apparatus for protecting a spot network type power receiving and transforming system, and more particularly to improvements in such a protective apparatus so that its protecting function can be reliably performed even when overall service interruption occurs at the primary side of network transformers during parallel operation of a spot network type power receiving and transforming system and an electric generator system.

An apparatus for protecting a spot network type power receiving and transforming system is widely employed as means for protecting a power receiving and transforming system in buildings because of its high reliability of interruption-free supply of power.

FIG. 1 is a diagram showing a basic structure of a prior art apparatus for protecting a spot network type power receiving and transforming system, and such a protective apparatus is disclosed in, for example, JP-A-57-68624. FIG. 1 illustrates the flowing direction of short-circuit current in the event of a short-circuit trouble in the spot network type power receiving and transforming system.

Referring to FIG. 1, a plurality of branch buses $B_1$ to $B_3$ are connected between three-phase power supply buses $L_1$ to $L_3$ and a common bus $B_0$ to which a plurality of loads R including, for example, an elevator M are connected. Network transformers $T_1$ to $T_3$, protector circuit breakers $P_1$ to $P_3$ and current transformers $C_1$ to $C_3$ are connected to the branch buses $B_1$ to $B_3$ respectively. When a short-circuit trouble occurs at, for example, a point A of the A $L_1$ power supply bus, a short-circuit current $i_s$ as shown by the solid lines in FIG. 1 flows toward the shorted point A through the route of the sound B $L_2$ power supply bus - branch bus $B_2$ - common bus $B_0$ - branch bus $B_1$. In the branch bus $B_1$, this short-circuit current $i_s$ flows in a reverse direction. That is, reverse current flows from the common bus $B_0$ toward the $L_1$ power supply bus and is detected by the current transformer $C_1$. The detection output current of the current transformer $C_1$ actuates a network relay $N_1$, and the protector circuit breaker $P_1$ is tripped to protect the spot network type power receiving and transforming system. This arrangement is generally called a spot network protector system. Considering an emergency in which supply of power from the power supply buses is interrupted, an emergency electric generator is disposed on one side of the common bus $B_0$, so that required power can be supplied to an emergency system only when supply of power to the power receiving system is entirely interrupted.

Recently, a multipurpose power generation system (referred to hereinafter as a co-generation system) has been put into practical use. In this co-generation system, electric power is generated by an electric generator driven by, for example, a gas turbine or a gas engine and, at the same time, the waste heat included in the exhaust from the gas turbine or gas engine is utilized for supplying, for example, hot water. As an energy saving system, this co-generation system finds its wide applications. Also, this co-generation system is also employed in buildings of medium and large scales. From the aspects of the effective utilization of the co-generation, and of the prevention of instantaneous break of a load this co-generation system is required to be temporarily or continuously linked with a power receiving system receiving power supplied from an electric power company. For the reasons described already, a spot network type power receiving and transforming system is widely employed in buildings. Because the co-generation system is also now being widely employed in buildings together with the spot network type power receiving and transforming system, parallel operation of the spot network type power receiving and transforming system and the electric generator of the co-generation system is now demanded.

When a short-circuit trouble occurs at a point of one of the primary-side power supply buses of the network transformers in the spot network type power receiving and transforming system, the short-circuit point must be isolated as soon as possible, and power distribution by the remaining sound power supply buses must be continued, as described already. For this purpose, each network transformer bank in the spot network protector system has a reverse power interrupting function. That is, a current from the network transformers connected to the sound power supply buses flows in a reverse direction through the network branch buses toward the network transformer connected to the faulty power supply bus, and the spot network protector system operates by detecting this reverse current thereby isolating the short-circuit point.

In the spot network type power receiving and transforming system, a situation has frequently occurred where regenerative power regenerated from the motor of the elevator produces flow of reverse power in the system even when no electric generator is provided on the load side. Such a situation is attributable to the fact that, when the elevator moves downward with full load or moves upward with no load, power substantially equal to that required for moving the elevator upward under full load is fed back toward the power supply side. When the total load of the power receiving and transforming system is large, the regenerative power regenerated from the motor of the elevator is canceled by the power received from the power supply, and the spot network protector system is not adversely affected. However, the total load of the power receiving and transforming system is small as in the nighttime, the regenerative power tends to become larger than the received power, and extra power is fed back toward the power supply side.

FIG. 2 shows that regenerative current from the motor of the elevator flows in the prior art spot network type power receiving and transforming system shown in FIG. 1. When the elevator M is of the gearless type having no reduction gearing, and the elevator M moves downward with full load or moves upward with no load, power substantially equal to that required for moving the elevator upward under full load is fed back toward the power supply side. Regenerative current $i_M$ produced by the regenerative power regenerated from the motor of the elevator M is shown by the dotted lines in FIG. 2. When the total load of the power receiving and transforming system is large as in the daytime, the regenerative power is canceled by the power received from the power supply, and the received power is only slightly decreased. However, in the nighttime in which the total load is small, extra power is fed back toward the power supply side from the network buses through the network transformers. Therefore, a controller (not shown) will decide that reverse power appears in all the network buses, and the spot network protector system will act to interrupt supply of power from the power supply buses, resulting in overall service interruption. Thus, when reverse power is supplied to all the banks, the controller decides that the appearance of reverse power is attributable to regenerative power regenerated from the motor of the elevator, and the spot network system is locked so as to prevent mal-operation of the circuit breakers.

When overall service interruption occurs on the primary-side power supply buses of the network transformers while the electric generator of, for example, the co-generation system is operating in parallel with the spot network type power receiving and transforming system, a reverse voltage is applied to the power supply buses from the electric generator. In such a case, all the network transformers are excited in the reverse direction, and reverse current flows in all the network transformers. As a result, the controller decides that regenerative power is supplied from the motor of the elevator, and the spot network protector system is locked as described above. Due to the locking of the spot network protector system, the power supply buses will be charged even in the case of service interruption. Such a situation is very dangerous from the aspect of safety of maintenance and inspection of the buses.

SUMMARY OF THE INVENTION

It is a primary object of the present invention to provide an apparatus for protecting a spot network type power receiving and transforming system so that, when overall service interruption occurs on network power supply buses, the buses can be safely inspected without the danger of any electric shock to an inspector.

Another object of the present invention is to provide a protective apparatus of the kind described above in which, when an electric generator is operating in parallel with the spot network type power receiving and transforming system, and power supply from the electric power company is suddenly completely interrupted under the above situation, the path of current from the generator is cut off by an associated circuit breaker, so that maintenance and inspection of the network power supply buses can be safely achieved.

Still another object of the present invention is to provide a protective apparatus of the kind described above in which the path of current from the electric generator is not cut off regardless of detection of supply of regenerative current from an elevator connected as one of loads of the spot network type power receiving and transforming system.

According to the present invention which attains these objects, one of circuit breakers including protector circuit breakers, a link circuit breaker and a generator circuit breaker is tripped under the condition that all these circuit breakers are closed and network relays are in operation.

When one of the circuit breakers, for example, the link circuit breaker is tripped, flow of reverse current from the electric generator toward the spot network type power receiving and transforming system can be prevented. Because no reverse current flows into the network power supply buses of the spot network type power receiving and transforming system, maintenance and inspection of the buses can be safely achieved.

BRIEF DESCRIPTION OF THE DRAWINGS

Preferred embodiments of the present invention will now be described in conjunction with the accompanying drawings, in which:

FIGS. 1 and 2 are system diagrams showing the basic structure of a prior art apparatus for protecting a spot network type power receiving and transforming system, in which FIG. 1 shows flow of short-circuit current, and FIG. 2 shows flow of regenerative current;

DESCRIPTION OF THE PREFERRED EMBODIMENTS

A first embodiment of the present invention will now be described in detail with reference to FIGS. 3, 4 and 5 which are a system diagram, a condition circuit diagram and an equivalent circuit diagram respectively.

Figure 1:
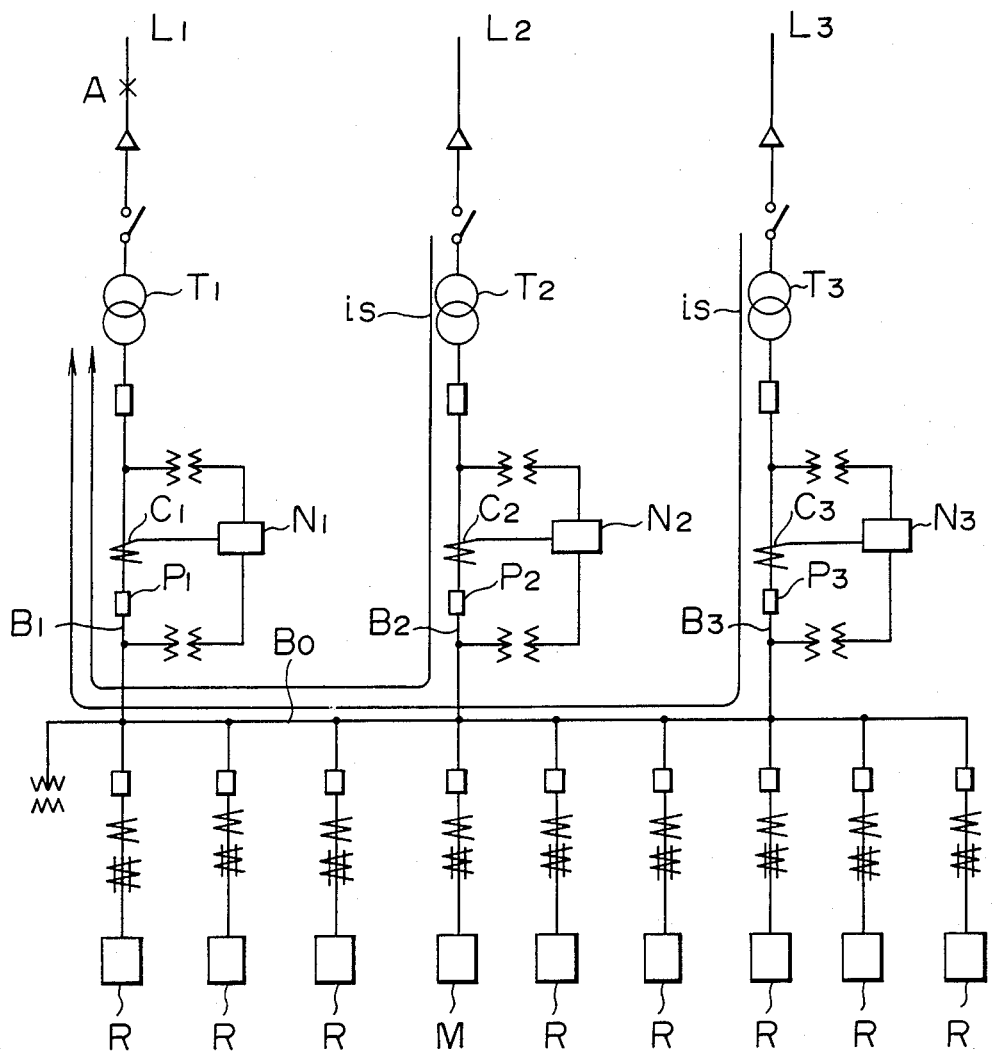
Figure 2:
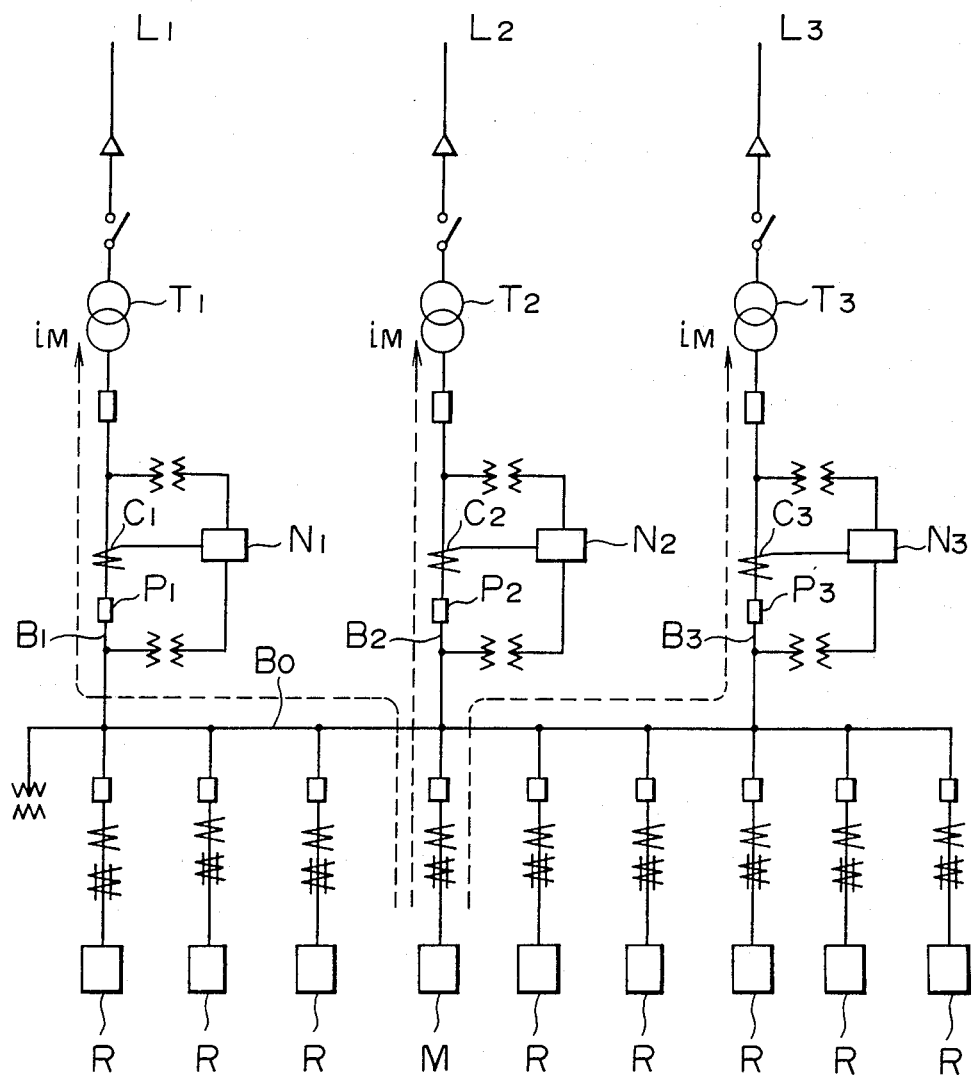
Figure 3:
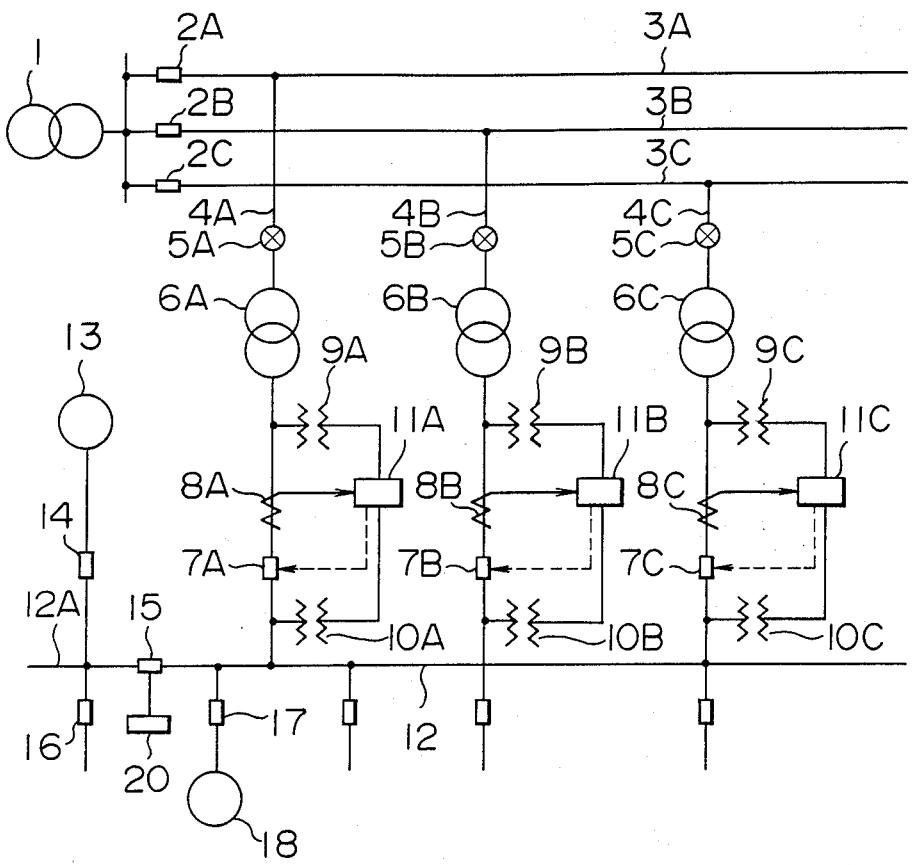
FIG. 3 is a system diagram showing the structure of a first embodiment of the apparatus for protecting a spot network type power receiving and transforming system.

Referring to FIG. 3, a power transformer 1 is connected at its primary side to power supply lines of an electric power company and at its secondary side to a plurality of (or normally more than two) power supply buses 3A to 3C through power distribution circuit breakers 2A to 2C respectively. The power supply buses 3A to 3C are connected to a common bus 12 by an A branch bus 4A, a B branch bus 4B and a C branch bus 4C having network transformers 6A to 6C, current transformers 8A to 8C, and protector circuit breakers 7A to 7C respectively. Network relays 11A to 11C are connected to the branch buses 4A to 4C through the current transformers 8A to 8C and potential transformers 9A to 9C and 10A to 10C respectively. An electric generator 13 is connected to the common bus 12 and another common bus 12A through a plurality of load power-distribution circuit breakers 16, 17 and a generator circuit breaker 14. A link circuit breaker 15 is connected between the common buses 12 and 12A. A load such as an elevator 18 is shown connected to the common bus 12 through one of the load power-distribution circuit breakers 17.

All of the power distribution circuit breakers 2A to 2C, protector circuit breakers 7A to 7C, generator circuit breaker 14, link circuit breaker 15 and load power-distribution circuit breakers 16, 17 shown in FIG. 3 may be air circuit breakers, and they are so named according to their service.

Figure 4:
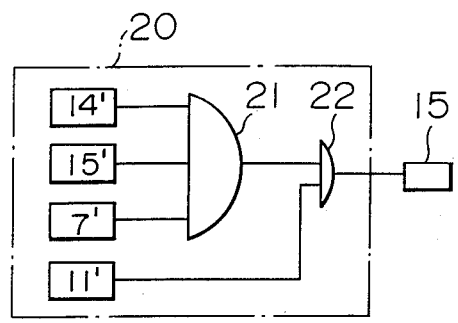
FIG. 4 is a circuit diagram of the condition circuit employed in the apparatus shown in FIG. 3.

A condition circuit 20 is connected to the link circuit breaker 15, and FIG. 4 shows the structure of the condition circuit 20.

Referring to FIG. 4, the condition circuit 20 is composed of a first AND circuit 21 acting as a parallel condition circuit, and a second AND circuit 22. When the circuit breakers 7, 14 and 15 are in operation, condition signals 7', 14' and 15' indicating the condition that the respective circuit breakers are in parallel operation are applied to the first AND circuit 21. An output signal 11' is generated from any one of the network relays 11A to 11C when it is closed. When this signal 11' is applied to the second AND circuit 22 together with the output signal of the first AND circuit 21, the second AND circuit 22 generates its output signal to trip the link circuit breaker 15. The condition circuit 20 may be connected to the circuit breakers other than the link circuit breaker 15. For example, the condition circuit 20 may be connected to the generator circuit breaker 14 or the protector circuit breakers 7A to 7C.

The operation of the first embodiment of the protective apparatus according to the present invention will now be described with reference to FIG. 3.

The electric generator 13 is normally continuously operated. Nowadays, most of loads are required to continuously operate without being disconnected from their power supply even a moment, and momentary service interruption is not permitted. Therefore, the link circuit breaker 15 is normally closed, and the spot network type power receiving system and the generator system are placed in the so-called parallel operation, so that, even when the electric generator 13 is stopped, power can be supplied with high reliability to the loads, for example, the circuit breakers 16, 17 and the elevator 18 connected to the common bus 12 without stopping the operation of these loads, because the common bus 12A is supplied with power from the spot network type power receiving system.

On the other hand, when current flows from the common bus 12 toward the network transformers 6A to 6C and is detected by the current transformers 8A to 8C, the network relays 11A to 11C are operated by the detection current outputs of the current transformers 8A to 8C, thereby tripping the protector circuit breakers 7A to 7C respectively.

Figure 5:
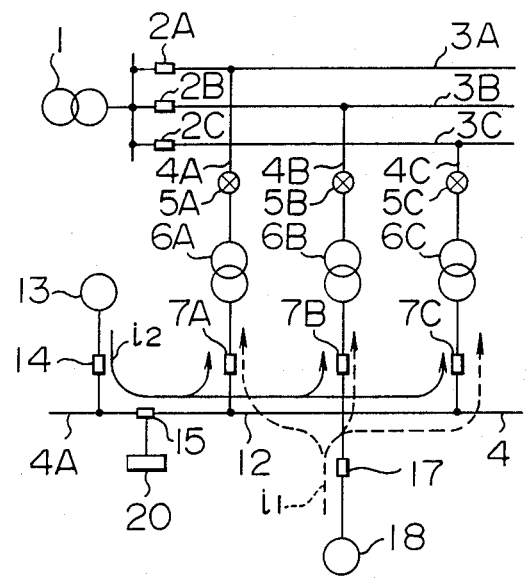
FIG. 5 is an equivalent circuit diagram for illustrating the operation of the apparatus shown in FIG. 3.

When the elevator 18 moves downward in its full-loaded condition or upward in its no-loaded condition, regenerative current $i_1$ produced due to the regenerative power regenerated from the motor of the elevator 18 flows out from the motor of the elevator 18 toward the network transformers 6A to 6C, as shown by the arrows and broken lines in FIG. 5. As is commonly known, the protector circuit breakers 7A to 7C in the spot network type power receiving and transforming system are tripped when such reverse power is generated. Therefore, when the regenerative power from the motor of the elevator 18 produces reverse power in all the network buses, the network relays 11A to 11C in all the network buses operate in response to the reverse power. In the present invention, a controller (not shown) decides that the regenerative power is supplied from the motor of the elevator 18 when all the network relays 11A to 11C operate, and, in such a case only, the protector circuit breakers 7A to 7C are prevented from being tripped.

Suppose then that the electric generator 13 and the spot network type power receiving system are in parallel operation, and the power supply from the electric power company is completely interrupted in such a situation. That is, when, for example, all of the power distribution circuit breakers 2A to 2C are opened, a reverse voltage is applied from the electric generator 13 toward the power supply buses 3A to 3C. In this case, reverse current $i_2$ from the electric generator 13 flows in a direction as shown by the arrows and solid lines in FIG. 5, and, because of the supply of reverse power to all the banks, the network relays 11A to 11C operate. Nevertheless, the protector circuit breakers 7A to 7C are not tripped in such a case. This is because the situation is similar to that occurred when the regenerative current $i_1$ is supplied from the motor of the elevator 18, that is, the reverse power is supplied to all the banks. However, in the present invention, the first AND circuit 21 in FIG. 4 acts as the parallel condition circuit because all of the generator circuit breaker 14, link circuit breaker 15 and protector circuit breakers 7A to 7C are in operation. When the AND condition of the second AND circuit 22 is satisfied in response to the application of the input signal thereto from the parallel condition circuit 21 together with the operation signal 11' indicative of the operation of the network relays 11A to 11C, the link circuit breaker 15 is opened by the output signal of the second AND circuit 22. As a result, the reverse current $i_2$ is not supplied from the electric generator 13 toward the spot network type power receiving system, and the operator can safely make maintenance and inspection of the power supply buses 3A to 3C.

Figure 6:
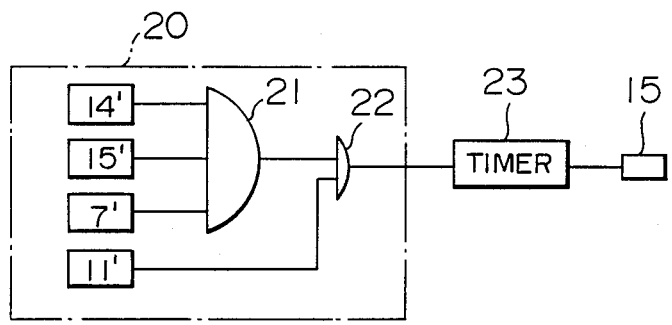
FIG. 6 is a circuit diagram of another form of the condition circuit employed in a second embodiment of the present invention.

FIG. 6 is a circuit diagram of another form of the condition circuit employed in a second embodiment of the present invention. In FIG. 6, a delay element such as a delay timer 23 is connected between the second AND circuit 22 shown in FIG. 4 and each circuit breaker, for example, the link circuit breaker 15. By the provision of such a timer 23, a period of time long enough for confirming the reliable operation of the associated circuit breaker can be furnished, so that undesirable mal-operation of the circuit breaker can be prevented.

It will be understood from the foregoing detailed description that the protection apparatus according to the present invention provides the following advantages among others:

(1) When no power is supplied to all the network power supply buses due to accidental overall service interruption, flow of reverse current from the electric generator toward the spot network type power receiving and transforming system can be prevented by tripping any one of the protector circuit breakers, link circuit breaker and generator circuit breaker. Therefore, no reverse current flows into the power supply buses of the spot network type power receiving and transforming system, and maintenance and inspection of the network power supply buses can be safely achieved.

(2) When an elevator is connected as a load, regenerative power supplied from the motor of the elevator can be detected by the function of the network relays, so that the protector circuit breakers can be prevented from tripped under such a situation. That is, a situation attributable to supply of regenerative power from the motor of the elevator can be readily distinguished from a situation attributable to overall interruption of power supplied to the power supply buses.

I claim:

1. An apparatus for protecting a spot network type power receiving and transforming system, comprising:
   (i) spot network protector means including:
      a common bus connected to loads,
      a plurality of branch buses connected to one end of said common bus and connected also to a plurality of power supply buses respectively,
      series circuits of network transformers, current transformers and protector circuit breakers connected to said branch buses respectively, and
      network relays connected in parallel with said series circuits of said current transformers and said protector circuit breakers respectively, said current transformers detecting reverse current flowing toward said power supply buses through said common bus, and said network relays operating in response to the detection of said current to trip said protector circuit breakers;

(ii) an electric generator connected to the other end of said common bus through a generator circuit breaker and operating in parallel with said spot network protector means; and (iii) a link circuit breaker connected to said common bus between said spot network protector means and said electric generator, any one of said protector circuit breakers, said link circuit breaker and said generator circuit breaker being tripped under the condition that all of said circuit breakers and said network relays are in operation, thereby cutting off the path of current from said electric generator.

2. A protective apparatus according to claim 1, wherein said link circuit is tripped when all of said network relays are in operation and said link circuit breaker, said generator circuit breaker and said protector circuit breakers are each in an operating state.

3. A protective apparatus according to claim 2, wherein, when reverse power is supplied to all of said branch buses due to regenerative power supplied from a motor of an elevator which is one of said loads, said protector circuit breakers are prevented from being tripped under the condition that all of said network relays are in operation due to said reverse power.

4. A protective apparatus according to claim 1, wherein said generator circuit breaker is tripped when all of said network relays are in operation and said link circuit breaker, said generator circuit breaker and said protector circuit breakers are each in an operating state.

5. A protective apparatus according to claim 4, wherein, when reverse power is supplied to all of said branch buses due to regenerative power supplied from a motor of an elevator which is one of said loads, said protector circuit breakers are prevented from being tripped under the condition that all of said network relays are in operation due to said reverse power.

6. A protective apparatus according to claim 1, wherein all of said protector circuit breakers are tripped when all of said network relays are in operation and said link circuit breaker, said generator circuit breaker and said protector circuit breakers are each in an operating state.

7. A protective apparatus according to claim 6, wherein, when reverse power is supplied to all of said branch buses due to regenerative power supplied from a motor of an elevator which is one of said loads, said protector circuit breakers are prevented from being tripped under the condition that all of said network relays are in operation due to said reverse power.

8. A protective apparatus according to claim 1, wherein delay means is provided to set a delay time long enough to confirm the condition that all of said protector circuit breakers, said link circuit breaker, said generator circuit breaker and said network relays are in operation, thereby preventing mal-operation of said circuit breakers.

9. A protective apparatus according to claim 8, wherein, when reverse power is supplied to all of said branch buses due to regenerative power supplied from a motor of an elevator which is one of said loads, said protector circuit breakers are prevented from being tripped under the condition that all of said network relays are in operation due to said reverse power.

10. A protective apparatus according to claim 1, wherein, when reverse power is supplied to all of said branch buses due to regenerative power supplied from a motor of an elevator which is one of said loads, said protector circuit breakers are prevented from being tripped under the condition that all of said network relays are in operation due to said reverse power.

11. An apparatus for protecting a spot network type power receiving and transforming system, comprising:
(i) spot network protector means, including:
    a common bus connected to loads,
    a plurality of circuits connected between said common bus and a pluratus of power supply buses, each said circuit including a network transformer in series with a current transformer and a protective circuit breaker with said current transformer and said protector circuit breaker located on the common bus side of said network transformer, and
    a plurality of network relays each connected in parallel with a series connection of said current transformer and said protector circuit breaker, said current transformers detecting reverse current flowing toward said power supply buses through said common bus, and said network relays operating in response to said current to trip said protector circuit breakers;
(ii) an electric power generator connected to an end of said common bus through a generator circuit breaker and operating coincident with said spot network protector means;
(iii) a link circuit breaker connected to said common bus between said spot network protector means and said electric power generator; and
(iv) condition means for selectively causing one of said protector circuit breakers, said link circuit breaker or said generator circuit breaker to be tripped under the condition that all of said circuit breakers and said network relays are in operation, thereby cutting off the path of current from said electric generator.

12. A protective apparatus according to claim 11, wherein said condition means includes a delay means to set a delay time long enough to confirm the condition that all of said circuit breakers and said network relays are in operation, thereby preventing mal-operation of said circuit breakers.

13. A protective apparatus according to claim 12, wherein, when reverse power is supplied to all of said plurality of circuits connected between said common bus and said plurality of power supply bases due to regenerative power supplied from a motor of an elevator which is one of said loads, said protector circuit breakers are prevented from being tripped under the condition that all of said network relays are in operation due to said reverse power.

14. A protective apparatus according to claim 11, wherein, when reverse power is supplied to all of said plurality of circuits connected between said common bus and said plurality of power supply buses due to regenerative power supplied from a motor of an elevator which is one of said loads, said protector circuit breakers are prevented from being tripped under the condition that all of said network relays are in operation due to said reverse power.

* * * * *